United States Patent
Pons

(10) Patent No.: US 9,810,212 B2
(45) Date of Patent: *Nov. 7, 2017

(54) FLUID LOAD LINE CALCULATION AND CONCAVITY TEST FOR DOWNHOLE PUMP CARD

(71) Applicant: Victoria M. Pons, Katy, TX (US)

(72) Inventor: Victoria M. Pons, Katy, TX (US)

(73) Assignee: Weatherford Technology Holdings, LLC, Houston, TX (US)

(*) Notice: Subject to any disclaimer, the term of this patent is extended or adjusted under 35 U.S.C. 154(b) by 438 days.

This patent is subject to a terminal disclaimer.

(21) Appl. No.: 13/663,161

(22) Filed: Oct. 29, 2012

(65) Prior Publication Data

US 2013/0108472 A1    May 2, 2013

Related U.S. Application Data

(60) Provisional application No. 61/552,812, filed on Oct. 28, 2011, provisional application No. 61/598,438,
(Continued)

(51) Int. Cl.
*F04B 49/06* (2006.01)
*E21B 43/12* (2006.01)
(Continued)

(52) U.S. Cl.
CPC .......... *F04B 49/065* (2013.01); *E21B 43/127* (2013.01); *E21B 47/0008* (2013.01);
(Continued)

(58) Field of Classification Search
CPC ...... F04B 49/065; F04B 47/022; F04B 49/20; F04B 51/00; F04B 2201/1211;
(Continued)

(56) References Cited

U.S. PATENT DOCUMENTS 3,343,409 A    9/1967  Gibbs
4,487,061 A *  12/1984 McTamaney et al. .......... 417/12
(Continued)

FOREIGN PATENT DOCUMENTS

RU    7456 U1     6/2001
RU    2168653 C2  12/2007
SU    1731987 A1   5/1992

OTHER PUBLICATIONS

DaCunha, J.J. & Gibbs, S.G. "Modeling a Finite-Length Sucker Rod Using the Semi-Infinite-Wave Equation and a Proof of Gibbs' Conjecture" Society of Petroleum Engineers (2009).*
(Continued)

*Primary Examiner* — Jay B Hann
(74) *Attorney, Agent, or Firm* — Blank Rome LLP

(57) ABSTRACT

A pump apparatus has a downhole pump disposed in a wellbore and has motor at a surface of the wellbore, and the downhole pump is reciprocated in the wellbore by a rod string operatively moved by the motor. A card indicative of load and position of the downhole pump is generated using surface measurements and a wave equation model having a damping factor or two damping factors. Actual fluid load lines are determined from the downhole card for upstroke and downstroke of the downhole pump, and calculated fluid load lines from the load distribution of the downhole data. The actual fluid load lines are compared to the calculated fluid load lines so that at least one parameter of the pump apparatus can be modified based on the comparison. For example, the damping of the wave equation model can be adjusted so that another downhole card can be generated.

29 Claims, 10 Drawing Sheets

Related U.S. Application Data filed on Feb. 14, 2012, provisional application No. 61/605,325, filed on Mar. 1, 2012, provisional application No. 61/706,489, filed on Sep. 27, 2012.

(51) Int. Cl.

| | | |
|---|---|---|
| *F04B 47/02* | (2006.01) | |
| *F04B 49/20* | (2006.01) | |
| *F04B 51/00* | (2006.01) | |
| *E21B 47/00* | (2012.01) | |
| *G05B 13/04* | (2006.01) | |

(52) U.S. Cl.
CPC ............ *F04B 47/022* (2013.01); *F04B 49/20* (2013.01); *F04B 51/00* (2013.01); *E21B 2043/125* (2013.01); *F04B 2201/121* (2013.01); *F04B 2201/1211* (2013.01); *G05B 13/042* (2013.01)

(58) Field of Classification Search
CPC ........... F04B 2201/121; E21B 47/0008; E21B 43/127; E21B 2043/125; G05B 13/042
See application file for complete search history.

(56) References Cited

U.S. PATENT DOCUMENTS

| | | | |
|---|---|---|---|
| 4,490,094 A | 12/1984 | Gibbs | |
| 5,252,031 A * | 10/1993 | Gibbs | 417/18 |
| 5,423,224 A | 6/1995 | Paine | |
| 5,464,058 A | 11/1995 | McCoy et al. | |
| 6,857,474 B2 * | 2/2005 | Bramlett et al. | 166/250.15 |
| 7,032,659 B2 | 4/2006 | Barnes et al. | |
| 7,168,924 B2 * | 1/2007 | Beck et al. | 417/44.11 |
| 7,212,923 B2 * | 5/2007 | Gibbs et al. | 702/13 |
| 7,500,390 B2 | 3/2009 | Mills | |
| 8,036,829 B2 * | 10/2011 | Gibbs et al. | 702/6 |
| 8,322,995 B2 * | 12/2012 | Ehimeakhe et al. | 417/53 |
| 8,328,527 B2 * | 12/2012 | Ehimeakhe | 417/53 |
| 8,849,594 B2 * | 9/2014 | Mills | E21B 47/0008 702/127 |
| 2003/0065447 A1 | 4/2003 | Bramlett et al. | |
| 2004/0062657 A1 | 4/2004 | Beck et al. | |
| 2006/0149476 A1 | 7/2006 | Gibbs et al. | |
| 2006/0251525 A1 | 11/2006 | Beck et al. | |
| 2007/0286750 A1 | 12/2007 | Beck et al. | |
| 2008/0240930 A1 * | 10/2008 | Palka et al. | 417/53 |
| 2010/0111716 A1 | 5/2010 | Gibbs et al. | |
| 2011/0091332 A1 | 4/2011 | Ehimeakhe et al. | |
| 2011/0091335 A1 | 4/2011 | Ehimeakhe et al. | |

OTHER PUBLICATIONS

Miska, S., et al. "A Simple Model for Computer-Aided Optimization and Design of Sucker-Rod Pumping Systems" J. Petroleum Science & Engineering, vol. 17, pp. 303-312 (1997).*
Theta Enterprises, Inc. "XDIAG: Advanced Rod Pumping System Expert Diagnostic Analysis" 2nd ed. (1997).*
Everitt, T.A., et al. "An Improved Finite-Difference Calculation of Downhole Dynamometer Cards for Sucker-Rod Pumps" SPE Production Engineering, vol. 7, No. 1, pp. 121-127 (1992).*
Everitt, T. A. and Jennings, J. W., "An Improved Finite-Difference Calculation of Downhole Dynamometer Cards for Sucker-Rod Pumps," SPE 18189, 1991.
Gibbs, S. G., "Design and Diagnosis of Deviated Rod-Pumped Wells", SPE 22787, 1992.
Lukasiewicz, S. A., "Dynamic Behavior of the Sucker Rod String in the Inclined Well", SPE 21665, 1991.
Lui, X. et al., "An Approach to the Design Calculation of Sucker Rod Pumping System in Coalbed Methane Wells," Chinese Journal of Mechanical Engineering, vol. 24, No. *, 2011.
Weatherford International, "ePIC Rod Pump Controller," Product Brochure, copyright 2008.
Weatherford International, "LOWIS: Life of Well Information Software," Product Brochure, copyright 2008.
Weatherford International, "Model 2000 Rod Pump Controller," Product Brochure, copyright 2008.
Weatherford International, "WellPilot Rod Pump Optimization Controller," Product Brochure, copyright 2010-2012.
International Search Report and Written Opinion received in counterpart PCT Appl. No. PCT/US2012/062463 dated Feb. 4, 2013.
Rosberg, "Well testing, methods and applicability", Engineering Geology Lund University, 2010. [Retreived on Dec. 21, 2012]. Retrieved from the internet:<URL:http://lup.lub.lu.se/luur/download?func=downloadFile&recordOld=1598933&fileOld=1598935>.
Weidner, "Horsepowe to Drive a Pump", Phillips Electric 2003, pp. 1-6 [Retreived on Dec. 21, 2012]. Retrieved from the internet:,URL:http://www.phillipselectric.com/pdf/HP_Req_for_Pumps.pdf> entire document.
International Search Report and Written Opinion received in counterpart PCT Appl. No. PCT/2012/062459 dated Jan. 15, 2013.
First Office Action received in counterpart Canadian Appl. No. 2,857,144 dated Mar. 12, 2015.
Ehimeakhe, V., "Comparative Study of Downhole Cards Using Modified Everitt-Jennings Method and Gibbs Method", Southwestern Petroleum Short Course 2010.
Ehimeakhe, V., "Calculating Pump Fillage for Well Control using Transfer Point Location", SPE Eastern Regional Meeting, Oct. 12-14, 2010.
Gibbs, S. G., and Neely, A. B., "Computer Diagnosis of Down-Hole Conditions in Sucker Rod Pumping Wells," JPT (Jan. 1996) 91-98; Trans., AIME,237.
Gibbs, S. G., "A Review of Methods for Design and Analysis of Rod Pumping Installations," SPE 9980 presented at the 1982 SPE International Petroleum Exhibition and Technical Symposium, Beijing, Mar. 18-26.
Knapp, R. M., "A Dynamic Investigation of Sucker-Rod Pumping," MS thesis, U. of Kansas, Topeka (Jan. 1969).
Schafer, D. J. and Jennings, J. W., "An Investigation of Analytical and Numerical Sucker-Rod Pumping Mathematical Models," paper SPE 16919 presented at the 1987 SPE Annual Technical Conference and Exhibition, Sep. 27-30.
Ehimeakhe, V., "Modified Everitt-Jennings (MEJ) Method and the Gibbs Method: Downhole Card Comparison", 6th Annual Sucker Rod Pumping Workshop, Sep. 14-17, 2010.
First Office Action received in counterpart Australian Appl. No. 2012348346 dated May 12, 2015.
First Office Action received in counterpart Chinese Appl. No. 201280065229.2 dated Nov. 25, 2015.
First Office Action received in counterpart Russian Appl. No. 2014121401 dated Nov. 12, 2015.
Rowlan, L., "Unaccounted Sources of Friction that Lead to Sticking and Other Problems," 6th Annual Sucker Rod Pumping Workshop, Dallas, Texas, Sep. 14-17, 2010.
Rowlan, L., "Reference Loads for the Downhole Pump Card," 4th Annual Sucker Rod Pumping Workshop, Houston Texas, Sep. 9-12, 2008.
Supplementary European Search Report received in counterpart EP Appl. No. 12855283 dated May 31, 2016, 9-pgs.
Second Office Action received in counterpart Canadian Appl. No. 2857144 dated Jun. 16, 2016, 13-pgs.
Decision on Grant received in counterpart Russian Appl. No. 2014121401 dated Jun. 16, 2016, 19-pgs.

* cited by examiner (BACKGROUND)

FLUID LOAD LINE CALCULATION AND CONCAVITY TEST FOR DOWNHOLE PUMP CARD

CROSS-REFERENCE TO RELATED APPLICATIONS

This application claims the benefit of U.S. Patent Application Ser. No. 61/552,812 entitled "Modified Everitt-Jennings With Dual Iteration on the Damping Factors and Adaptation to Deviated Wells by Including Coulombs Friction" and filed 28-Oct.-2011; Ser. No. 61/598,438 entitled "Modified Everitt-Jennings With Dual Iteration on the Damping Factors" and filed 14 Feb. 2012; Ser. No. 61/605,325 entitled "Implementing Coulombs Friction for the Calculation of Downhole Cards in Deviated Wells" and filed 1 Mar. 2012; and Ser. No. 61/706,489 entitled "Iterating on Damping when Solving the Wave Equation and Computation of Fluid Load Lines and Concavity Testing" and filed 27 Sep. 2012, each of which is incorporated herein by reference in its entirety. This application is also filed concurrently with co-pending application Ser. No. 13/663,155 entitled "Calculating Downhole Cards in Deviated Wells," Ser. No. 13/663,167 entitled "Calculating Downhole Pump Card With Iterations on Single Damping Factor," and Ser. No. 13/663,174 entitled "Calculating Downhole Pump Card With Iterations on Dual Damping Factors," each of which is incorporated herein by reference in its entirety.

BACKGROUND OF THE DISCLOSURE

A. Sucker Rod Pump System

Reciprocating pump systems, such as sucker rod pump systems, extract fluids from a well and employ a downhole pump connected to a driving source at the surface. A rod string connects the surface driving force to the downhole pump in the wall. When operated, the driving source cyclically raises and lowers the downhole pump, and with each stroke, the downhole pump lifts well fluids toward the surface.

For example, FIG. 1 shows a sucker rod pump system 10 used to produce fluid from a well. A downhole pump 14 has a barrel 16 with a standing valve 24 located at the bottom. The standing valve 24 allows fluid to enter from the wellbore, but does not allow the fluid to leave. Inside the pump barrel 16, a plunger 20 has a traveling valve 22 located at the top. The traveling valve 22 allows fluid to move from below the plunger 20 to the production tubing 18 above, but does not allow fluid to return from the tubing 18 to the pump barrel 16 below the plunger 20. A driving source (e.g., a pump jack 11) at the surface connects by a rod string 12 to the plunger 20 and moves the plunger 20 up and down cyclically in upstrokes and downstrokes.

During the upstroke, the traveling valve 22 is closed, and any fluid above the plunger 20 in the production tubing 18 is lifted towards the surface. Meanwhile, the standing valve 24 opens and allows fluid to enter the pump barrel 16 from the wellbore. The highest point of the plunger's motion is typically referred to as the "top of stroke" (TOS), while the lowest point of the pump plunger's motion is typically referred to as the "bottom of stroke" (BOS).

At the TOS, the standing valve 24 closes and holds in the fluid that has entered the pump barrel 16. Additionally, at the TOS, the weight of the fluid in the production tubing 18 is supported by the traveling valve 22 in the plunger 20 and, therefore, also by the rod string 12, which causes the rod string 12 to stretch.

During the downstroke, the traveling valve 22 initially remains closed until the plunger 20 reaches the surface of the fluid in the barrel 16. Sufficient pressure builds up in the fluid below the traveling valve 22 to balance the pressure. The build-up of pressure in the pump barrel 16 reduces the load on the rod string 12 so that the rod string 12 relaxes.

This process takes place during a finite amount of time when the plunger 20 rests on the fluid, and the pump jack 11 at the surface allows the top of the rod string 12 to move downward. The position of the pump plunger 20 at this time is known as the "transfer point" because the load of the fluid column in the production tubing 18 is transferred from the traveling valve 22 to the standing valve 24. This results in a rapid decrease in load on the rod string 12 during the transfer.

After the pressure balances, the traveling valve 22 opens and the plunger 20 continues to move downward to its lowest position (i.e., the BOS). The movement of the plunger 20 from the transfer point to the BOS is known as the "fluid stroke" and is a measure of the amount of fluid lifted by the pump 14 on each stroke. In other words, the portion of the pump stroke below the transfer point may be interpreted as the percentage of the pump stroke containing fluid, and this percentage corresponds to the pump's fillage. Thus, the transfer point can be computed using a pump fillage calculation.

If there is sufficient fluid in the wellbore, the pump barrel 16 may be completely filled during an upstroke. Yet, under some conditions, the pump 14 may not be completely filled with fluid on the upstroke so there may be a void left between the fluid and the plunger 20 as it continues to rise. Operating the pump system 10 with only a partially filled pump barrel 16 is inefficient and, therefore, undesirable. In this instance, the well is said to be "pumped off," and the condition is known as "pounding," which can damage various components of the pump system. For a pumped off well, the transfer point most likely occurs after the TOS of the plunger 20.

Typically, there are no sensors to measure conditions at the downhole pump 14, which may be located thousands of feet underground. Instead, numerical methods are used calculate the position of the pump plunger 20 and the load acting on the plunger 20 from measurements of the position and load for the rod string 12 at the pump jack 11 located at the surface. These measurements are typically made at the top of the polished rod 28, which is a portion of the rod string 12 passing through a stuffing box 13 at the wellhead. A pump controller 26 is used for monitoring and controlling the pump system 10.

To efficiently control the reciprocating pump system 10 and avoid costly maintenance, a rod pump controller 26 can gather system data and adjust operating parameters of the system 10 accordingly. Typically, the rod pump controller 26 gathers system data such as load and rod string displacement by measuring these properties at the surface. While these surface-measured data provide useful diagnostic information, they may not provide an accurate representation of the same properties observed downhole at the pump. Because these downhole properties cannot be easily measured directly, they are typically calculated from the surface-measured properties.

Methods for determining the operational characteristics of the downhole pump 20 have used the shape of the graphical representation of the downhole data to compute various details. For example, U.S. Pat. No. 5,252,031 to Gibbs, entitled "Monitoring and Pump-Off Control with Downhole Pump Cards," teaches a method for monitoring a rod pumped well to detect various pump problems by utilizing measurements made at the surface to generate a downhole pump card. The graphically represented downhole pump card may then be used to detect the various pump problems and control the pumping unit. Other techniques for determining operational characteristics are disclosed in U.S. Patent Publication Nos. 2011/0091332 and 2011/0091335, which are both incorporated herein by reference in their entireties.

B. Everitt-Jennings Method

In techniques to determine operational characteristics of a sucker rod pump system 10 as noted above, software analysis computes downhole data (i.e., a pump card) using position and load data measured at the surface. The most accurate and popular of these methods is to compute the downhole card from the surface data by solving a one-dimensional damped wave equation, which uses surface position and load as recorded at the surface.

Various algorithms exist for solving the wave equation. Snyder solved the wave equation using a method of characteristics. See Snyder, W. E., "A Method for Computing Down-Hole Forces and Displacements in Oil Wells Pumped With Sucker Rods," Paper 851-37-K, 1963. Gibbs employed separation of variables and Fourier series in what can be termed the "Gibb's method." See Gibbs, S. G. et al., "Computer Diagnosis of Down-Hole Conditions in Sucker Rod Pumping Wells," JPT (January 1996) 91-98; Trans., AIME, 237; Gibbs, S. G., "A Review of Methods for Design and Analysis of Rod Pumping Installations," SPE 9980, 1982; and U.S. Pat. No. 3,343,409.

In 1969, Knapp introduced finite differences to solve the wave equation. See Knapp, R. M., "A Dynamic Investigation of Sucker-Rod Pumping," M S thesis, U. of Kansas, Topeka (January 1969). This is also the method used by Everitt and Jennings. See Everitt, T. A. and Jennings, J. W., "An Improved Finite-Difference Calculation of Downhole Dynamometer Cards for Sucker-Rod Pumps," SPE 18189, 1992; and Pons-Ehimeakhe, V., "Modified Everitt-Jennings Algorithm With Dual Iteration on the Damping Factors," 2012 South Western Petroleum Short Course. The Everitt-Jennings method has also been implemented and modified by Weatherford International. See Ehimeakhe, V., "Comparative Study of Downhole Cards Using Modified Everitt-Jennings Method and Gibbs Method," Southwestern Petroleum Short Course 2010.

To solve the one-dimensional wave equation, the Everitt-Jennings method uses finite differences. The rod string is divided into M finite difference nodes of length $L_i$ (ft), density $\rho_i$ (lbm/ft$^3$) and area $A_i$ (in$^2$). If we let u=u(x, t) be the displacement of position x at time t in a sucker rod pump system, the condensed one-dimensional wave equation reads:

$$v^2 \frac{\partial^2 u}{\partial x^2} = \frac{\partial^2 u}{\partial t^2} + D\frac{\partial u}{\partial t} \quad (1)$$

where the acoustic velocity is given by:

$$v = \sqrt{\frac{144Eg}{\rho}}$$

and D represents a damping factor.

The first and second derivatives with respect to time are replaced by the first-order-correct forward differences and second-order-correct central differences. The second derivative with respect to position is replaced by a slightly rearranged second-order-correct central difference.

In the method, the damping factor D is automatically selected by using an iteration on the system's net stroke (NS) and the damping factor D. The damping factor D can be computed by the equation:

$$D = \frac{(550)(144 \text{ g})}{\sqrt{2}\,\pi} \frac{(H_{PR} - H_H)\tau^2}{(\Sigma\rho_i A_i L_i)S^2} \quad (2)$$

Where $H_{PR}$ is the polished rod horsepower (hp), S is the net stroke (in), $\tau$ is the period of one stroke (sec.), and $H_{HYD}$ is the hydraulic horsepower (hp) obtained as follows:

$$H_{HYD}=(7.36\cdot10^{-6})Q\gamma F_l \quad (3)$$

where Q is the pump production rate (B/D), $\gamma$ is the fluid specific gravity, and $F_l$ is the fluid level (ft). The pump production rate is given by:

$$Q=(0.1166)(SPM)Sd^2 \quad (4)$$

where SPM is the speed of the pumping unit in strokes/minute, and d is the diameter of the plunger.

Additional details on the derivation of the damping factor D in equation (2) and the original iteration on the net stroke and damping factor algorithm are provided in Everitt, T. A. and Jennings, J. W., "An Improved Finite-Difference Calculation of Downhole Dynamometer Cards for Sucker-Rod Pumps," SPE 18189, 1992.

A modified Everitt-Jennings method also uses finite differences to solve the wave equation. As before, the rod string is discretized into M finite difference elements, and position and load (including stress) are computed at each increment down the wellbore. Then, as shown in FIG. 2, an iteration is performed on the net stroke and damping factor, which automatically selects a damping factor for each stroke.

The wave equation is initially solved to calculate the downhole card using surface measurements and an initial damping factor D set to 0.5 (Block 41). The initial net stroke $S_0$ is determined from the computed card, and the fluid level in the well is calculated (Block 42). At this point, a new damping factor D is calculated from equation (2) (Block 43) and so forth, and the downhole card is again computed with the new damping factor D (Block 44). Based on the recalculated downhole card, a new net stroke S is determined (Block 45).

At this point, a check is then made to determine whether the newly determined net stroke S is close within some tolerance C of the initial or previous net stroke (Decision 46). If not, then another iteration is needed, and the process 40 returns to calculating the damping factor D (Block 43). If the newly determined net stroke is close to the previously determined net stroke (yes at Decision 46), then the iteration for determining the net stroke can stop, and the process 40 continues on to iterate on the damping factor D using the converged net stroke S (Block 47). The downhole data is then calculated using the newly calculated damping factor D (Block 48), and the pump horsepower $H_{Pump}$ is then calculated (Block 49a).

At this point, a check is made to see if the pump horsepower $H_{pump}$ is close within some tolerance to the hydraulic horsepower $H_{hyd}$ (Decision 49b). If so, then the process 40 ends as successfully calculating the downhole pump card with converged net stroke and damping factor D (Block 49c). If the pump horsepower $H_{pump}$ and the hydraulic horsepower $H_{hyd}$ are not close enough (no at Decision 49b), then the process 40 adjusts the current damping factor D by a ratio of the pump horsepower $H_{Pump}$ and the hydraulic horsepower $H_{Hyd}$ (Block 49d). The process 40 of calculating the pump card with this adjusted damping factor D is repeated until the values for the pump and hydraulic horsepower $H_{Pump}$ and $H_{Hyd}$ are close within the specified tolerance (Blocks 48 through 49d).

The advantage of the automatic iteration on the net stroke and the damping factor D as set forth above is that the damping factor D is adjusted automatically without human intervention. Thus, users managing a medium group to a large group of wells do not have to spend time manually adjusting the damping factor D as may be required by other methods.

C. Downhole Card and Damping

FIG. 3A shows exemplary surface data 50 obtained at the surface of the well. Load (y-axis) is graphed in relation to position (x-axis) as measured at the surface by a dynamometer system or the like. Using the techniques discussed previously, the measured surface data 50 can be mathematically translated to downhole data or pump card 60, which is shown ideally in this figure.

The pump card 60 has an upstroke fluid load line 62 ($F0_{up}$) and a downstroke fluid load line ($F0_{down}$). The height 63 of the pump card 60 is referred to as the fluid stroke F0, where F0=the upstroke fluid load line 62 ($F0_{up}$)–the downstroke fluid load line 64 ($F0_{down}$).

The pump or downhole stroke (PS) refers to the measure of extreme travel of the rod derived at the location of the pump. Thus, the "pump stroke" refers to the maximum displacement minus the minimum displacement and corresponds to the horizontal span or width of the downhole pump card 60.

Yet, the net stroke 68 (NS) refers to the measure of the portion of the pump stroke (PS) during which the fluid load is supported by the pump's standing valve. For a pumped off card 60' as shown in FIG. 3B, the net stroke 68 (NS) is measured relative to the transfer point 66, which is the displacement in the pump stroke where load is transferred from the pump's traveling valve to the standing valve. (The transfer point can be computed using a pump fillage calculation.) The transfer point 66 occurs because the pressure in the pump barrel has exceeded the pressure in the plunger. The portion of the stroke below (with lower displacement than) the transfer point 66 is the net stroke NS and is interpreted as the portion of the pump stroke (PS) that actually contains liquid.

The displacement and load data can be used to determine one or more characteristics of the downhole pump's operation, such as the minimum pump stroke, the maximum pump stroke, and the transfer point in the downhole stroke. In turn, the area A of the pump card 60 or 60' gives the pump horsepower of the downhole pump (20).

Using the wave equation as noted previously, the downhole pump card 60 is calculated from the surface data 50. The calculation requires that a damping factor D be used in the wave equation to add or remove energy from the calculation. If the calculation is over-damped as shown in FIG. 3C, then the downhole card 60A will be calculated with a shape as schematically shown. By contrast, if the calculation is under-damped, then the downhole card 60B will be calculated with a shape as schematically shown in FIG. 3D.

When analyzing surface data 50 and calculating the downhole card 60, the fluid load lines 62 and 64 represent the maximum and minimum loads applied to the rod string (12) by the pump (20) based on the current fluid level. When gas measurements are available, the fluid load lines 62 and 64 can be readily computed using the pump's intake pressure and the pump's discharge pressure. In the absence of these measurements, however, the fluid load lines 62 and 64 must be computed by other means.

In general, the fluid load lines 62 and 64 can be drawn on a graphical representation of the downhole card 60 because the fluid load lines 62 and 64 can generally be identified visually. When dealing with a large group of wells, however, any type of visual determination of fluid load lines 62 and 64 is highly impractical. Thus, because the fluid load lines 62 and 64 determine the fluid load used to compute the volumetric displacement of the pump (20) as well as fluid levels of the well, being able to determine fluid load lines 62 and 64 based on measured and calculated data can be quite useful for operating and diagnosing sucker rod pump systems.

SUMMARY OF THE DISCLOSURE

A pump apparatus has a downhole pump disposed in a wellbore and has motor at a surface of the wellbore, and the downhole pump is reciprocated in the wellbore by a rod string operatively moved by the motor. A card indicative of load and position of the downhole pump is generated using surface measurements and a wave equation model having a damping factor. Actual fluid load lines are determined from the downhole card for upstrokes and downstrokes of the downhole pump, and calculated fluid load lines for from the strokes are determined from load values distributed on the downhole card. The actual fluid load lines are compared to the calculated fluid load lines so that at least one parameter of the pump apparatus can be modified based on the comparison. For example, the damping factor of the wave equation model can be adjusted so that another downhole card can be generated.

DETAILED DESCRIPTION OF THE DISCLOSURE

As noted above, downhole data in a sucker rod pump system is either measured at the downhole pump or calculated from surface measured data using the wave equation. Knowledge of the downhole conditions is important for diagnosing and controlling the reciprocating system efficiently. For example, downhole data can help diagnose downhole conditions, calculate volumetric displacements, and compute efficiency of the pump system.

The teachings of the present disclosure provide a method for determining actual fluid load lines as well as calculated (representative) fluid load lines for a downhole pump card. The actual fluid load lines are the lines referred to in FIGS. 3A-3D, while the calculated fluid load lines depend on the load distribution of the pump card. Using these two lines, a concavity test can determine if the downhole card in question is under-damped or over-damped.

Figure 1:
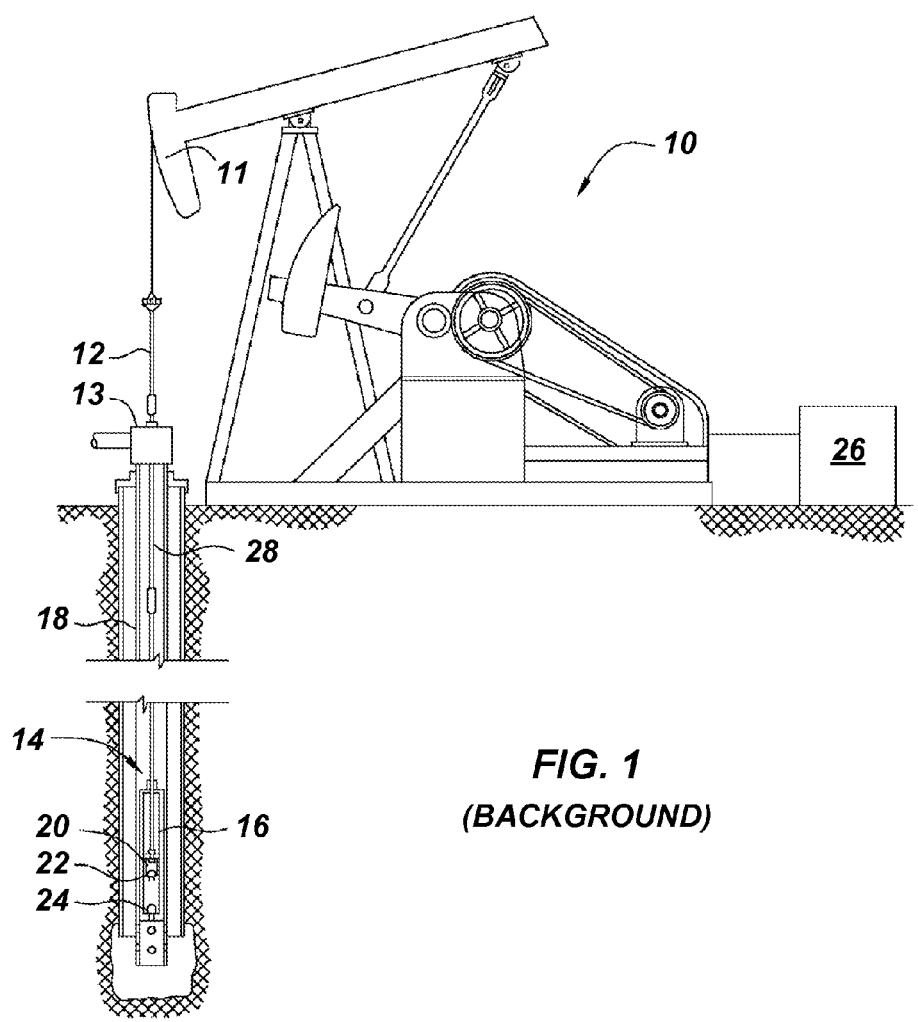
FIG. 1 illustrates a sucker rod pump system.
Figure 2:
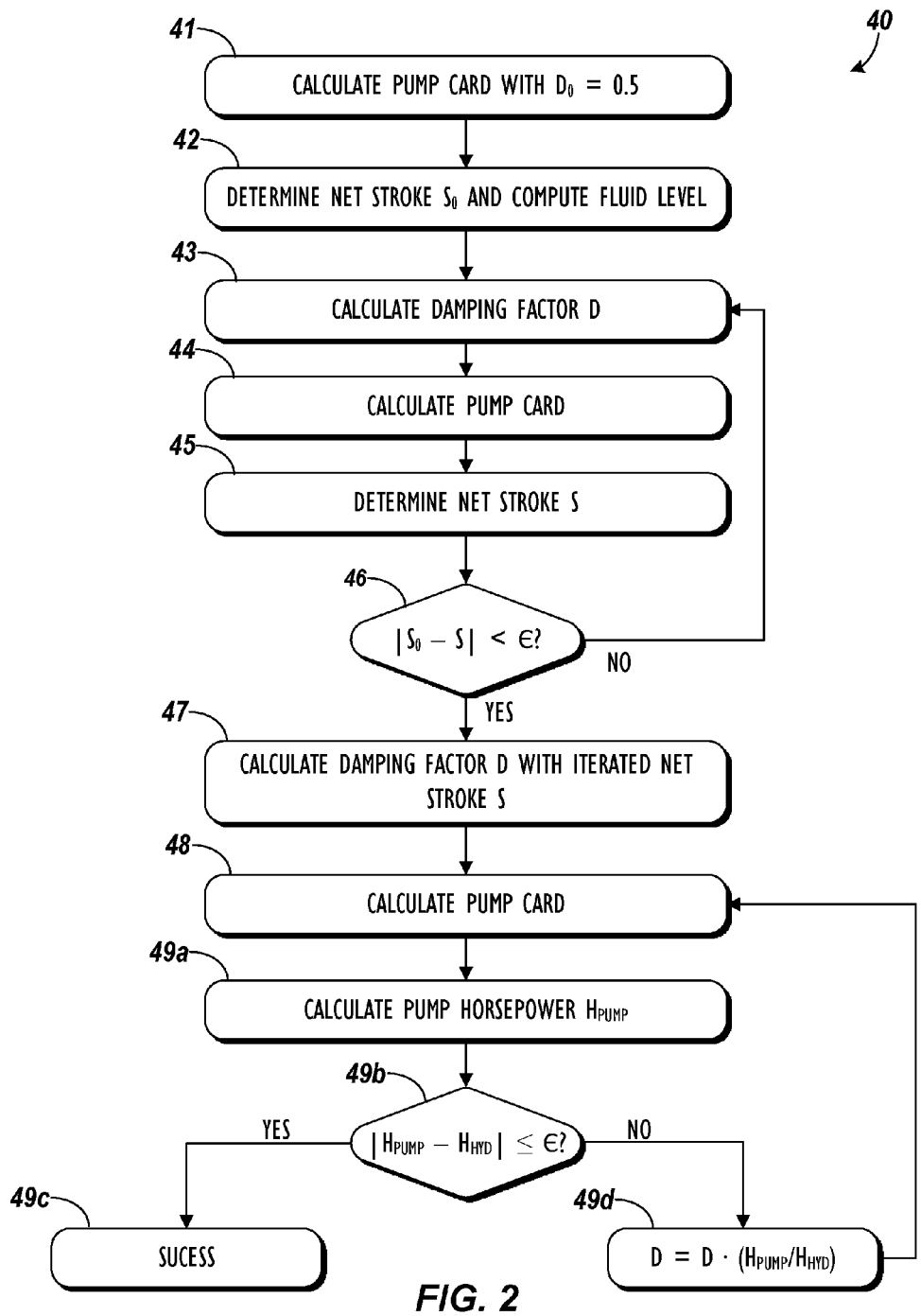
FIG. 2 illustrates iteration on net stroke and damping factor for the modified Everitt-Jennings algorithm to compute a pump card according to the prior art.
Figure 3:
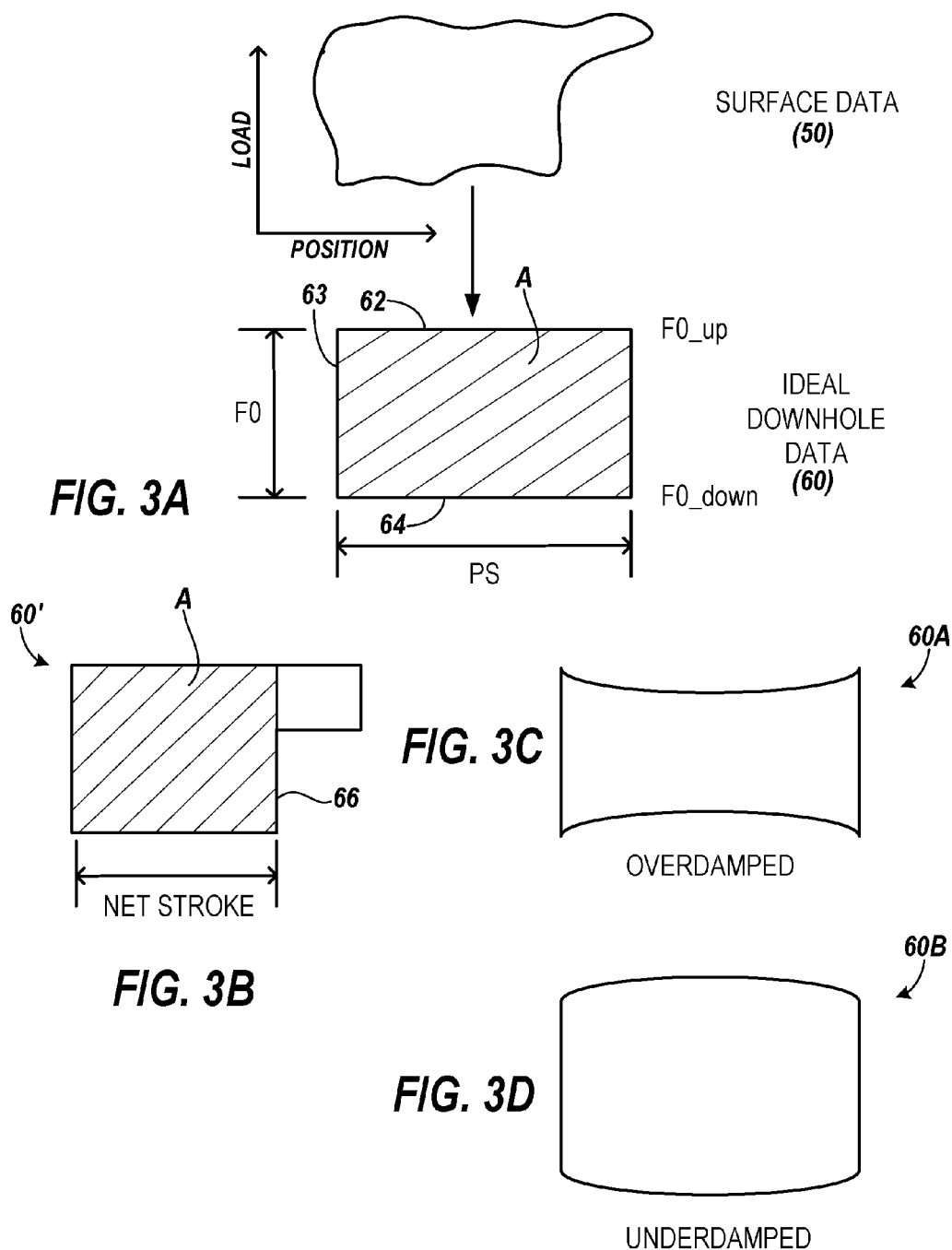
FIG. 3A shows the correlation between surface data obtained at the surface of the well to downhole data for a pump.
FIG. 3B shows the net stroke for a pumped off card.
FIG. 3C diagrams a downhole card that is over-damped.
FIG. 3D diagrams a downhole card that is under-damped.
Figure 4:
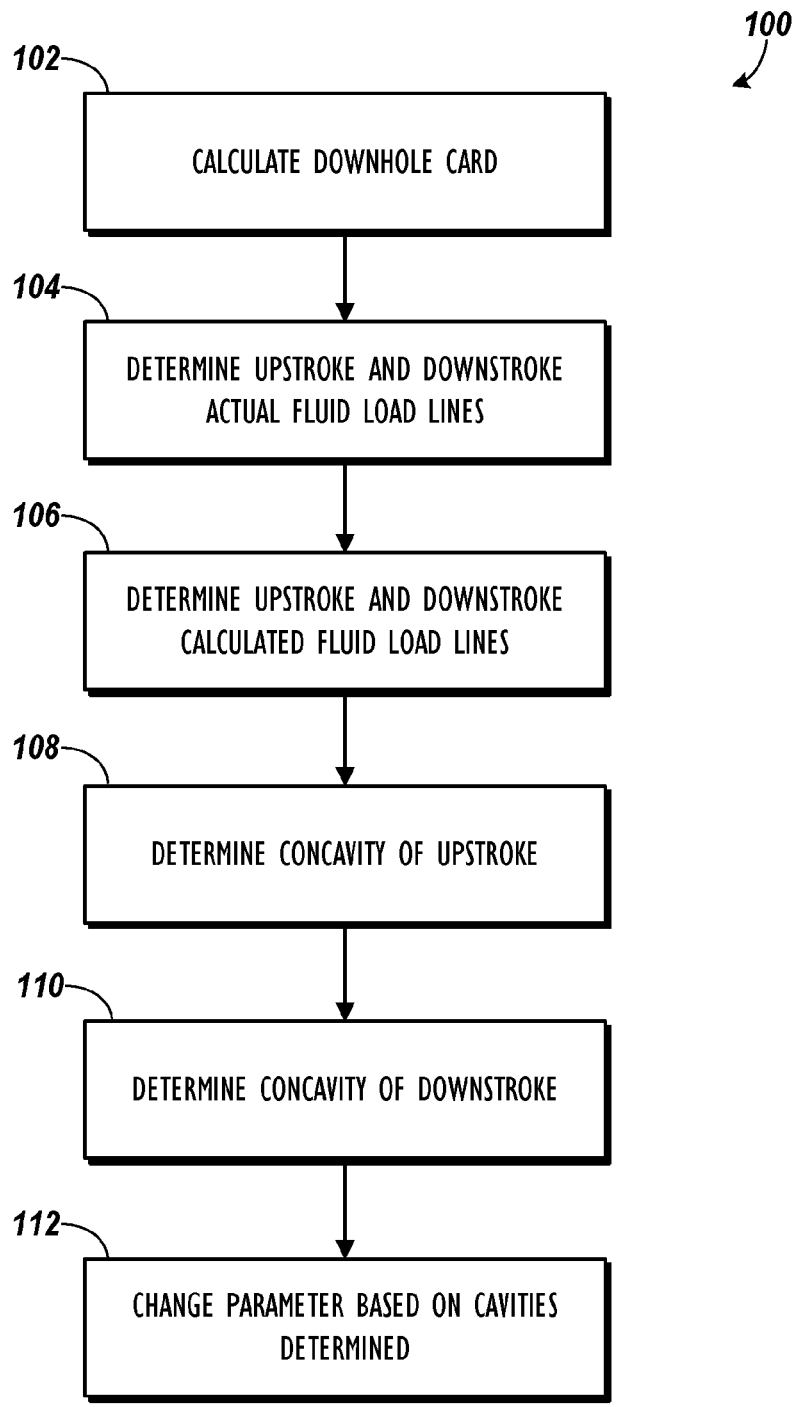
FIG. 4 is a flow chart for determining fluid load lines and determining the concavity of the fluid load lines according to the present disclosure.
Figure 5A:
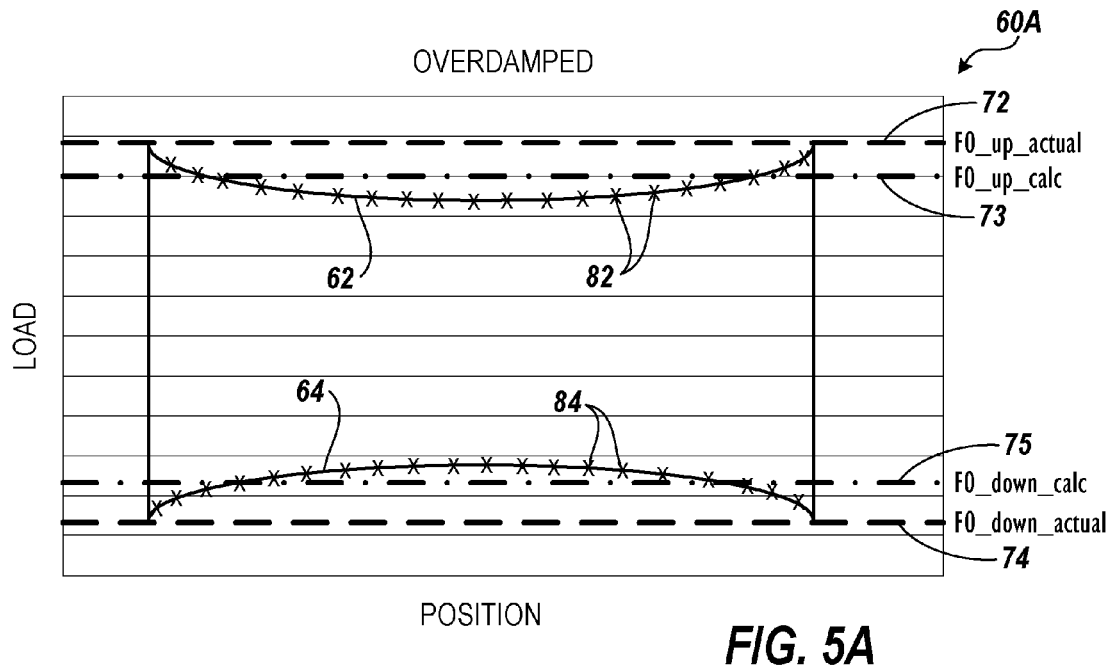
FIG. 5A shows fluid load lines being determined for an over-damped downhole card.
Figure 5B:
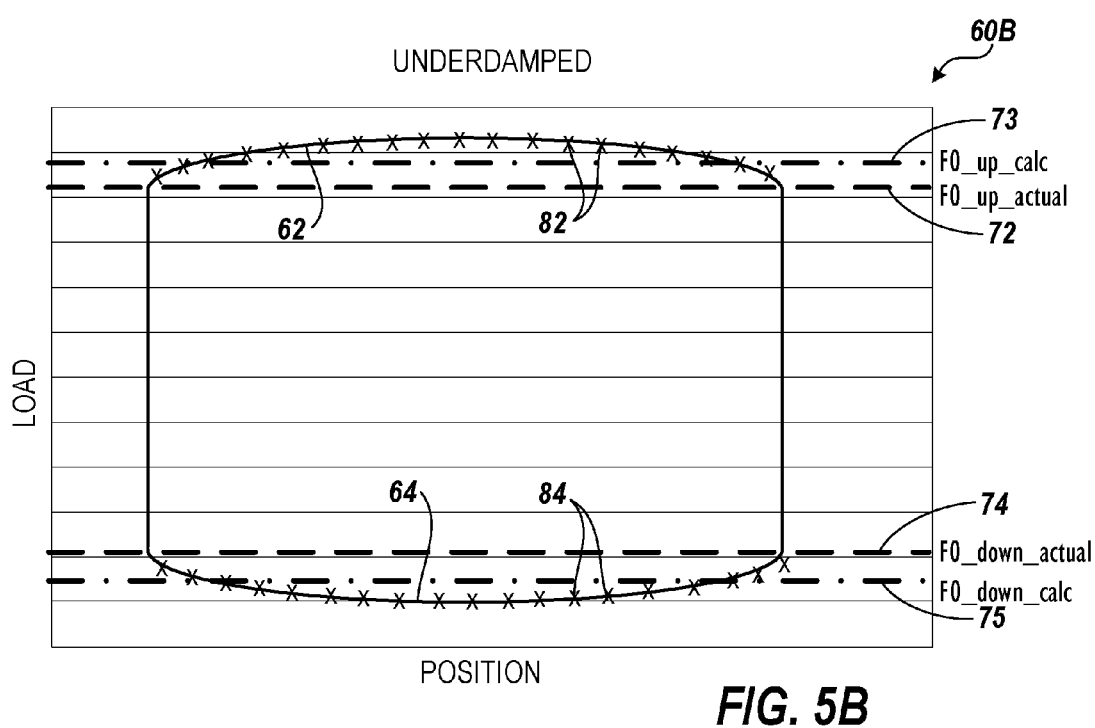
FIG. 5B shows fluid load lines being determined for an under-damped downhole card.

Turning to FIG. 4, a process 100 determines fluid load lines of a downhole pump card (e.g., 60A and 60B; FIGS. 5A-5B) and determines a concavity of the fluid load lines. In turn, these determinations can be used for the various purposes disclosed herein.

The process 100 begins by calculating the downhole card (e.g., 60A and 60B; FIGS. 5A-5B) using available techniques or more preferably the techniques disclosed herein (Block 102). The upstroke and downstroke actual fluid load lines are then determined from the downhole card (Block 104).

FIGS. 5A and 5B show representations of downhole cards—one card 60A is over-damped and another card 60B is under-damped for illustrative purposes. For the purposes of the present disclosure, the actual fluid load lines 72 and 74 are load lines that would typically be selected by a user. These fluid load lines 72 and 74 correspond to fluid load values disregarding any upstroke or downstroke friction and correspond to the pump intake pressure and the pump discharge pressure, respectively. The upstroke actual fluid load line 72 is referred to as $F0_{up}$actual, and the downstroke actual fluid load line 74 is referred to as $F0_{down}$actual.

Finding the upstroke and downstroke actual fluid load lines 72 and 74 involves locating the right hand corners of the graphical representation of the downhole card 60A or 60B. Although this can be done visually, it is done mathematically when processed by a pump controller or other processing device as disclosed herein. For example, the upstroke actual fluid load line 72 corresponds to the top of stroke, which is located by finding the zero of the first derivative of the pump's position downhole (i.e., finding when the velocity of the pump's movement is zero).

The downstroke actual fluid load line 74 corresponds to the lower right hand corner. Finding the lower right corner corresponds to finding the concave up point after the transfer point, which is the point at which the fluid load is transferred from the standing valve to the traveling valve in the downhole pump. Thus, the concave up point can be found by finding the absolute minimum of the second derivative of the pump's position downhole (i.e., finding the minimum acceleration after the transfer point). FIGS. 5A-5B show idealized downhole cards, but additional figures disclosed herein show actual fluid load lines calculated for exemplary data.

With the actual fluid load lines 72 and 74 determined in the process 100 of FIG. 4 (Block 104), the process 100 then determines calculated (representative) fluid load lines (Block 106). The calculated fluid load lines, which may also be referred to herein as representative fluid load lines, represent load values corresponding to the distribution of the upstroke and downstroke loads in the downhole data.

Determining the calculated fluid load lines can be done statistically, although other mathematical methods can be used. As shown in FIGS. 5A-5B, upstroke loads 82 are distributed along the upstroke fluid load lines 62 of the downhole cards 60A-B, and downstroke loads 84 are likewise distributed along the downstroke fluid load lines 64 of the downhole cards 60A-B.

The upstroke and downstroke loads 82 and 84 are statistically ordered by load ranges to produce probability density functions. The maximums of the probability functions yield the set of load ranges in which most of the upstroke and downstroke loads reside, respectively. In other words, the maximum of the probability density function for the upstroke loads is referred to as the upstroke calculated fluid load line $F0_{up}$calc, while the maximum of the probability density function for the downstroke loads is referred to as the downstroke calculated fluid load line $F_{down}$calc.

For example, the upstroke and downstroke loads 82 and 84 are statistically ordered so that the loads 82 and 84 are grouped in load ranges, such as 0 to 100, 101 to 200, 201 to 300, etc., although any segments or ranges may be used. Partitioned in this way, the load range with the most load values 82 before the top of stroke in the upstroke corresponds to the upstroke calculated fluid load line 73 ($F0_{up}$calc). Similarly, the load range with the most load values 84 after the transfer point in the downstroke corresponds to the downstroke calculated fluid load line 75 ($F0_{down}$calc).

Thus, these load lines 73 and 75 represent in a sense the median values for the upstroke loads 72 and downstroke loads 74, respectively. Although statistical analysis for the load values in ranges has been described here to find the calculated fluid load lines 73 and 74, any other numerical method could be used, such as best fit line or linear interpolation. However, preferably as here, the techniques used are robust and do not require extensive computing power for a pump controller or other processing device.

By knowing the actual and calculated fluid load lines 72 & 73 and 74 & 75, parameters associated with the calculation of the downhole pump card 60A-B and associated with the diagnosis and control of the pump system (10) can be changed. This can achieve any of the various purposes disclosed herein, including adjusting the damping factor, stopping the pump system 10 periodically to allow more fluid to enter the wellbore, or controlling the speed of the pump system 10 so that it does not pump more fluid than enters the wellbore.

In particular, using both the actual and the calculated fluid load lines 72 & 73 and 74 & 75, the process 100 of FIG. 4 can also determine the concavity of the card's upstroke load line 62 (Block 108) and the concavity of the card's downstroke load line 64 (Block 110). By knowing the concavity of the load lines 62 and 64, parameters associated with the calculation of the downhole card 60A-B and associated with the diagnosis and control of the pump system 10 can be changed to achieve any of the various purposes disclosed herein.

For example, the actual and calculated fluid load lines computed 72 & 73 and 74 & 75 can indicate whether the downhole card is over-damped (e.g., 60A) or under-damped (e.g., 60B). As mentioned above, the actual fluid load lines 72 and 74 are the theoretical values where the fluid load lines of the card 60A-B should be. Thus, where the calculated fluid load lines 73 and 75 are located with respect to the actual fluid load lines 72 and 74 gives an indication of the state of damping in the wave equation used to calculate the downhole card. Ideally, the respective actual fluid load lines 72 and 74 and the calculated fluid load lines 73 and 75 are equal because this would mean that the pump horsepower (i.e., the area of the downhole pump card) is equal to the hydraulic horsepower (i.e., the fluid lifted).

By comparing the actual and calculated fluid load lines 72 & 73 and 74 & 75, the concavity of the load values in the downhole data 60A-B can be determined so that the damping used in the wave equation can be adjusted accordingly or so that some other purpose may be achieved as will be appreciated by one skilled in the art.

As shown in FIG. 5A where the upstroke calculated fluid load line 73 ($F0_{up}$calc) is less than the upstroke actual fluid load line 72 ($F0_{up}$actual), the downhole data may be determined as over-damped. Likewise in FIG. 5A, where the downstroke calculated fluid load line 75 ($F0_{down}$calc) is greater than the downstroke actual fluid load line 74 ($F0_{down}$actual), the downhole data may be determined as over-damped. A tolerance may be used in the comparison of the values for the fluid load lines that may depend on the particular implementation. Moreover, depending on the processing used, both conditions of the upstroke calculated fluid load line 73 being less than the upstroke actual fluid load line 72 and the downstroke calculated fluid load line 75 being greater than the downstroke actual fluid load line 74 may need to be true for the downhole data to be determined over-damped.

By contrast as shown in FIG. 5B where the upstroke calculated fluid load line 73 ($F0_{up}$calc) is greater than the upstroke actual fluid load line 72 ($F0_{up}$actual), the downhole data may be determined as under-damped. Likewise in FIG. 5B, where the downstroke calculated fluid load line 75 ($F0_{down}$calc) is less than the downstroke actual fluid load line 74 ($F0_{down}$actual), the downhole data may be determined as under-damped. Again, depending on the processing used, both conditions of the upstroke calculated fluid load line 73 being greater than the upstroke actual fluid load line 72 and the downstroke calculated fluid load line 75 being less than the downstroke actual fluid load line 74 may need to be true for the downhole data to be determined under-damped.

Knowing the relationship of the actual and calculated fluid load lines 72 & 73 and 74 & 75 and whether the data is over or under damped, any damping factor used in the wave equation calculation of the surface data can be appropriately adjusted so that the downhole card 60 will more appropriately represent actual conditions downhole. Additionally, knowing the relationship of the actual and calculated fluid load lines 72 & 73 and 74 & 75 can be used for other purposes.

Figure 6A:
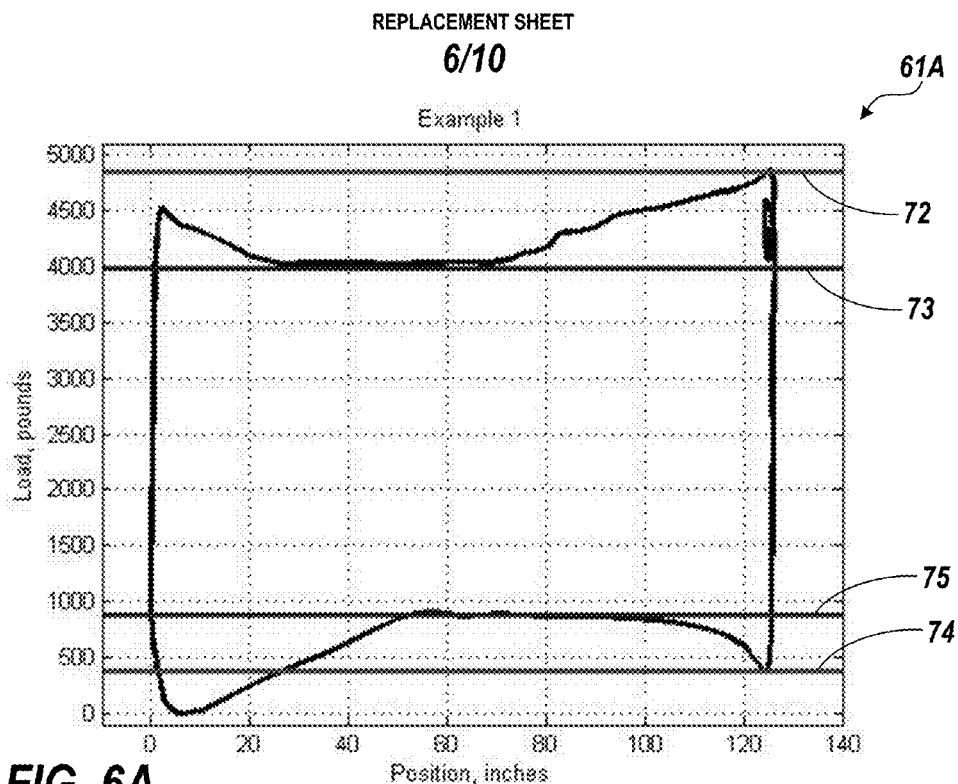
FIGS. 6A through 6H show fluid load lines determined from various examples of downhole cards.

For further illustrations, FIGS. 6A through 6H show fluid load lines determined from various examples of downhole cards 61A-61H calculated from example well data. In FIG. 6A, the upstroke actual load line 72 ($F0_{up}$actual) is 4856, and the upstroke calculated fluid load line 73 ($F0_{up}$calc) is 3982. The downstroke actual load line 74 ($F0_{down}$actual) is 372, and the downstroke calculated fluid load line 75 ($F0_{down}$calc) is 875. This is indicative of over-damping.

Figure 6B:
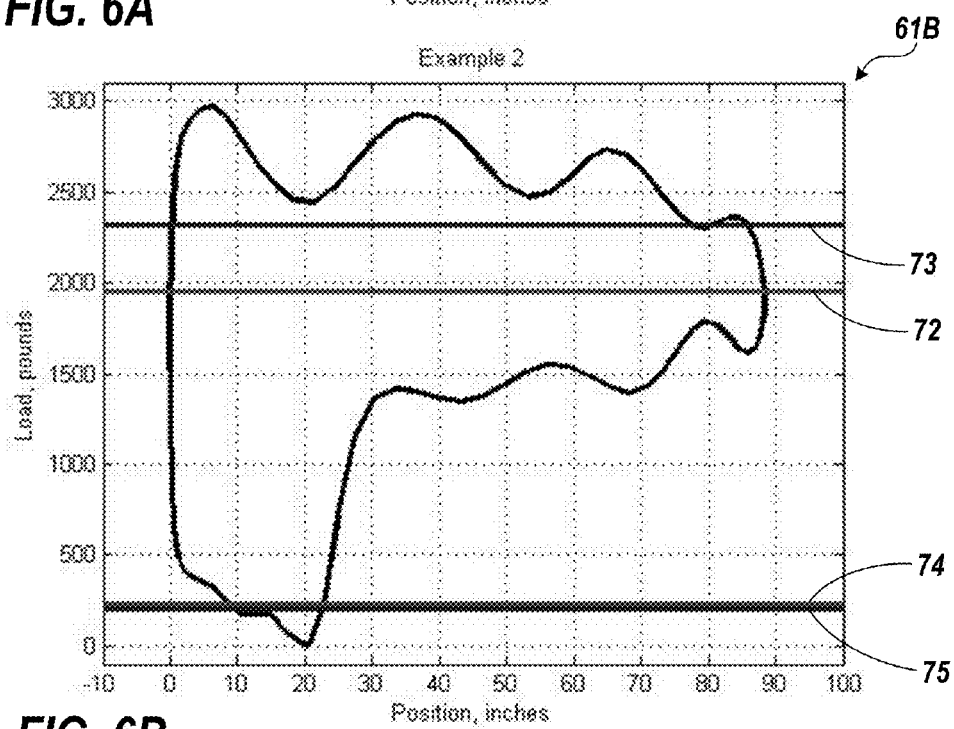

In FIG. 6B, the upstroke actual load line 72 ($F0_{up}$actual) is 1951, and the upstroke calculated fluid load line 73 ($F0_{up}$calc) is 2320. The downstroke actual load line 74 ($F0_{down}$actual) is 229, and the downstroke calculated fluid load line 75 ($F0_{down}$calc) is 216. This is indicative of under-damping at least in the upstroke because the downstroke fluid load lines may be indicated as practically equal.

Figure 6C:
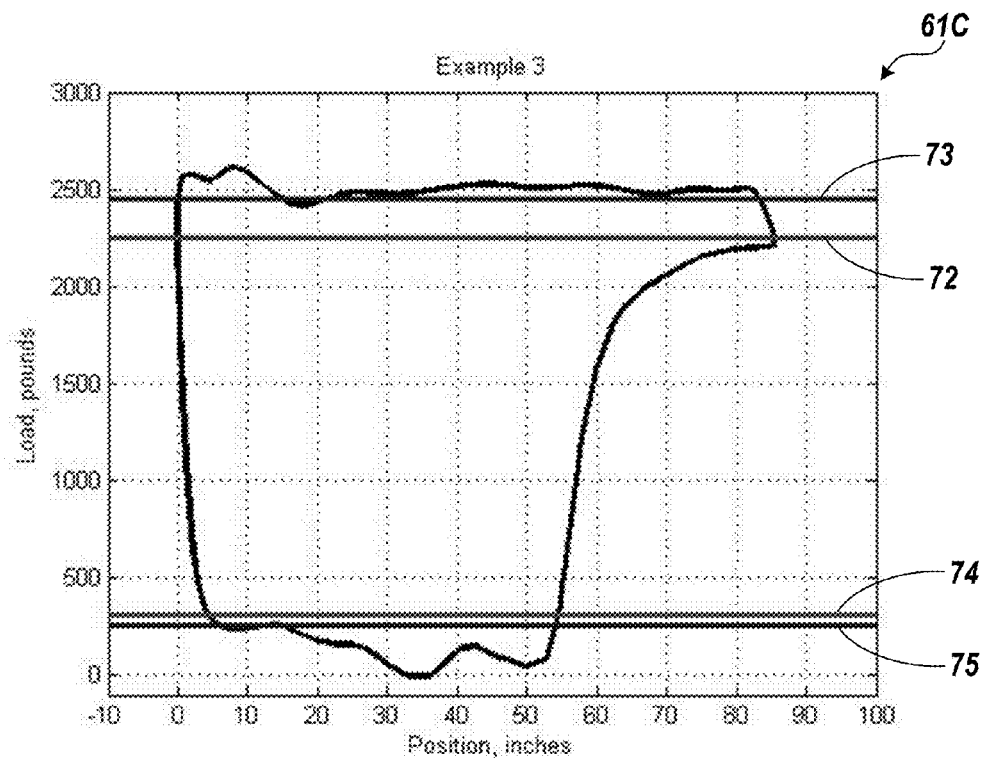

In FIG. 6C, the upstroke actual load line 72 ($F0_{up}$actual) is 2256, and the upstroke calculated fluid load line 73 ($F0_{up}$calc) is 2455. The downstroke actual load line 74 ($F0_{down}$actual) is 313, and the downstroke calculated fluid load line 75 ($F0_{down}$calc) is 261. This is indicative of under-damping at least in the upstroke because the downstroke fluid load lines may be indicated as practically equal.

Figure 6D:
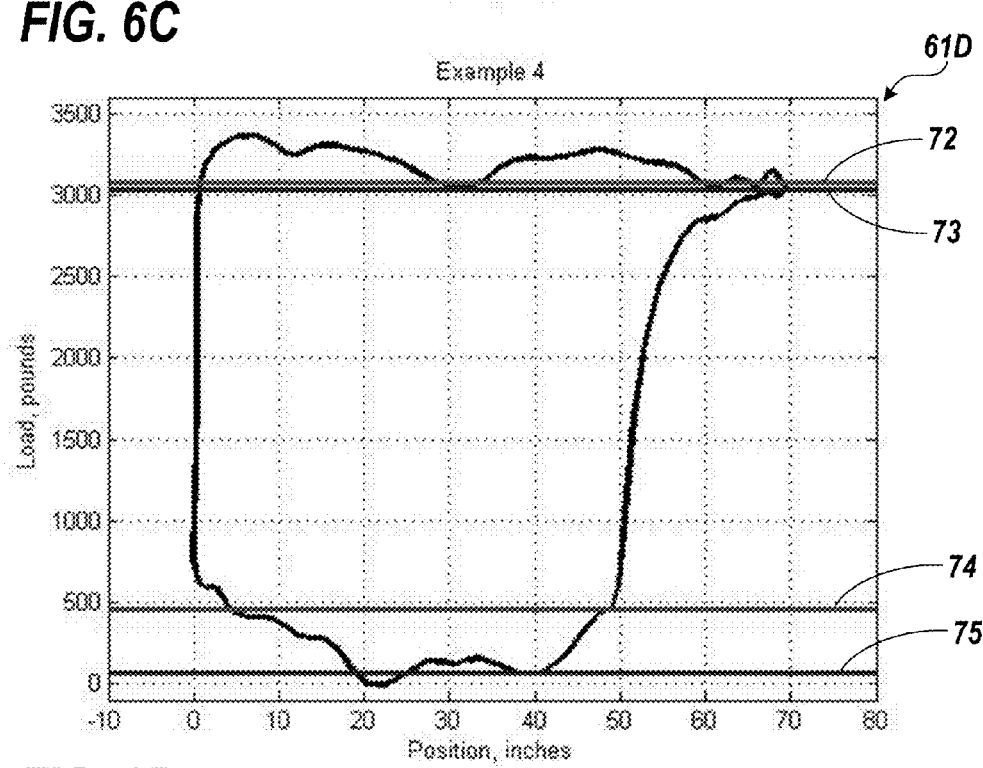

In FIG. 6D, the upstroke actual load line 72 ($F0_{up}$actual) is 3072, and the upstroke calculated fluid load line 73 ($F0_{up}$calc) is 3028. The downstroke actual load line 74 ($F0_{down}$actual) is 454, and the downstroke calculated fluid load line 75 is ($F0_{down}$calc) is 67. This is indicative of under-damping at least in the downstroke because the upstroke fluid load lines may be indicated as practically equal.

Figure 6E:
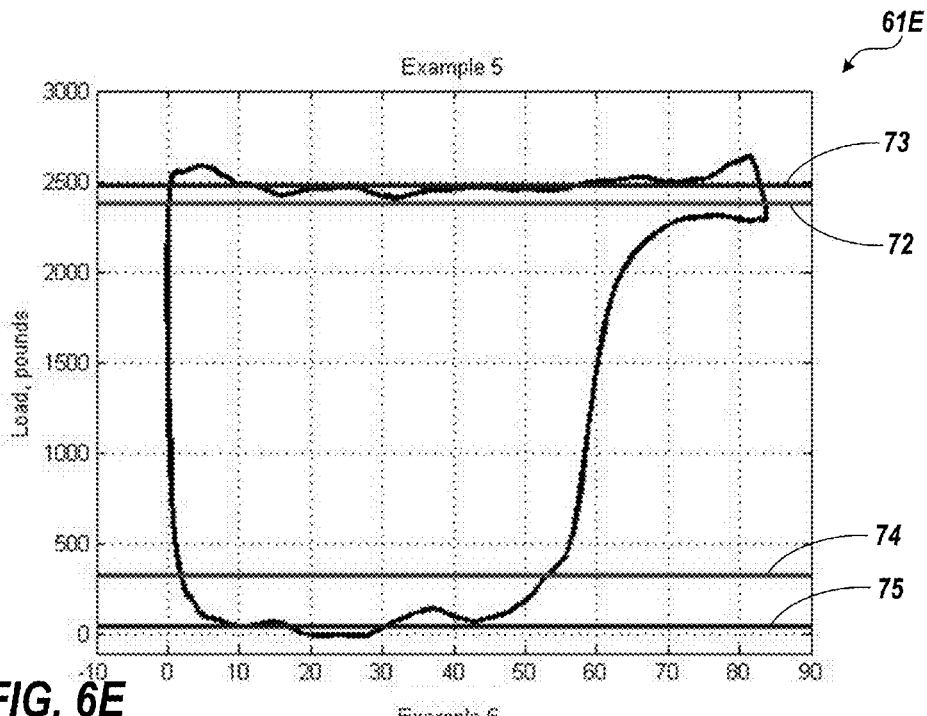

In FIG. 6E, the upstroke actual load line 72 ($F0_{up}$actual) is 2375, and the upstroke calculated fluid load line 73 ($F0_{up}$calc) is 2478. The downstroke actual load line 74 ($F0_{down}$actual) is 334, and the downstroke calculated fluid load line 75 ($F0_{down}$calc) is 53. This is indicative of under-damping.

Figure 6F:
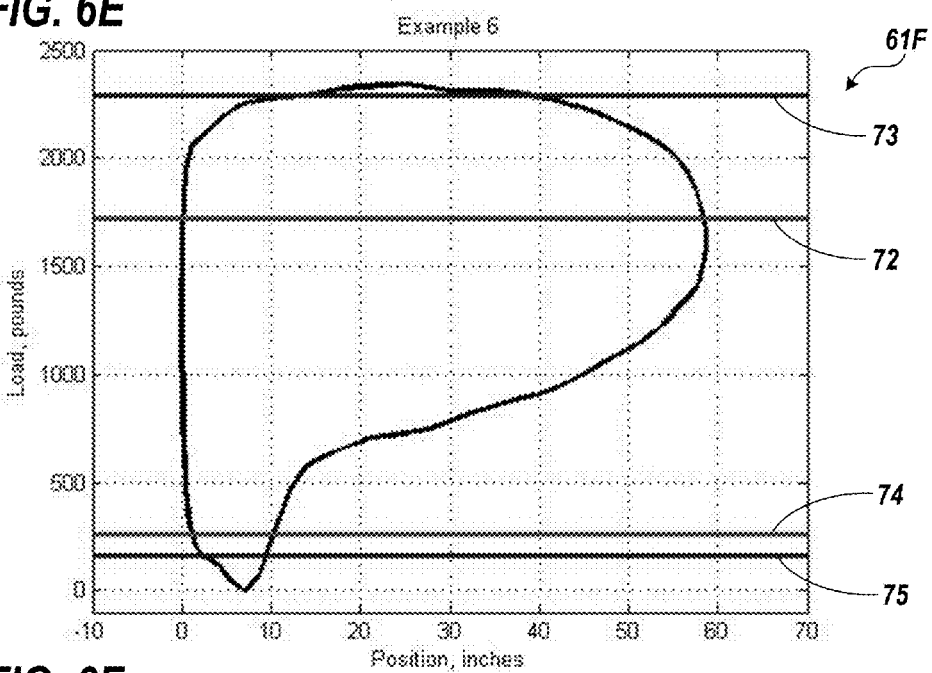

In FIG. 6F, the upstroke actual load line 72 ($F0_{up}$actual) is 1717, and the upstroke calculated fluid load line 73 ($F0_{up}$calc) is 2293. The downstroke actual load line 74 ($F0_{down}$actual) is 260, and the downstroke calculated fluid load line 75 ($F0_{down}$calc) is 156. This is indicative of under-damping.

Figure 6G:
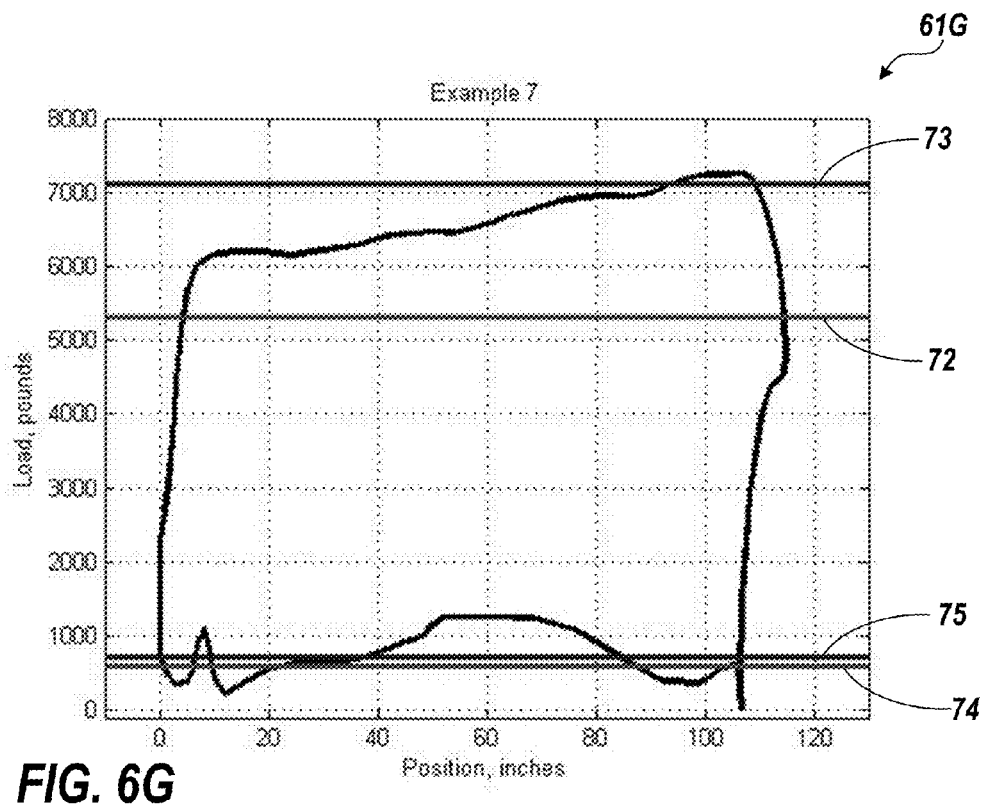

In FIG. 6G, the upstroke actual load line 72 ($F0_{up}$actual) is 5302, and the upstroke calculated fluid load line 73 ($F0_{up}$calc) is 7301. The downstroke actual load line 74 ($F0_{down}$actual) is 591, and the downstroke calculated fluid load line 75 ($F0_{down}$calc) is 725. This is indicative of under-damping at least in the upstroke.

Figure 6H:
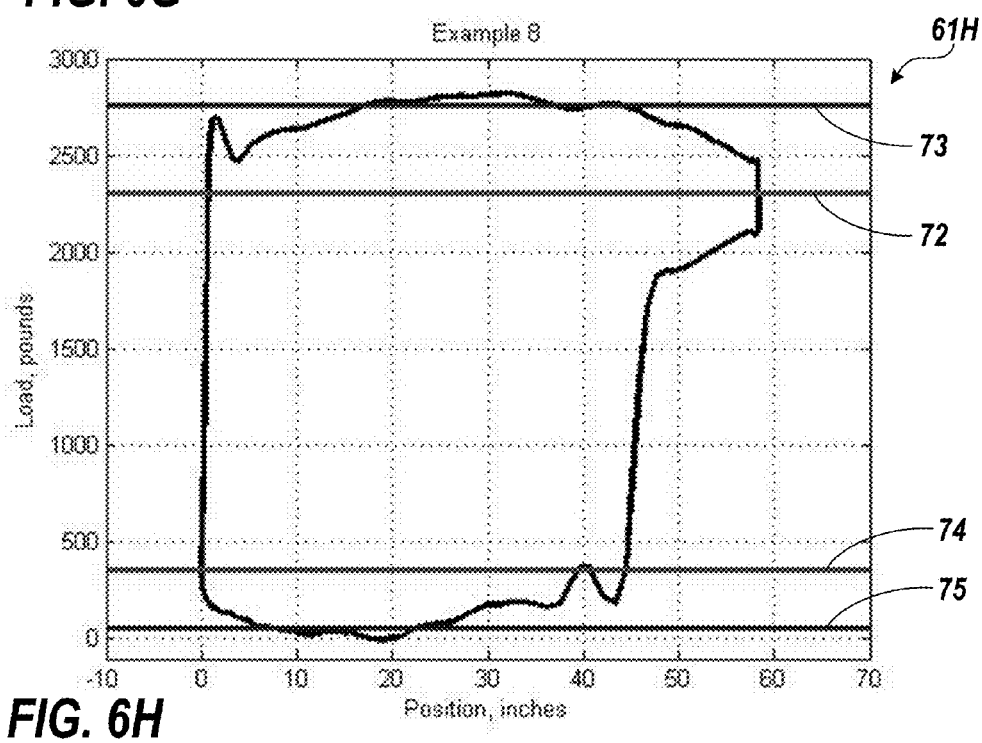

In FIG. 6H, the upstroke actual load line 72 ($F0_{up}$actual) is 2340, and the upstroke calculated fluid load line 73 ($F0_{up}$calc) is 2763. The downstroke actual load line 74 ($F0_{down}$actual) is 824, and the downstroke calculated fluid load line 75 ($F0_{down}$calc) is 56. This is indicative of under-damping.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure.

Figure 7A:
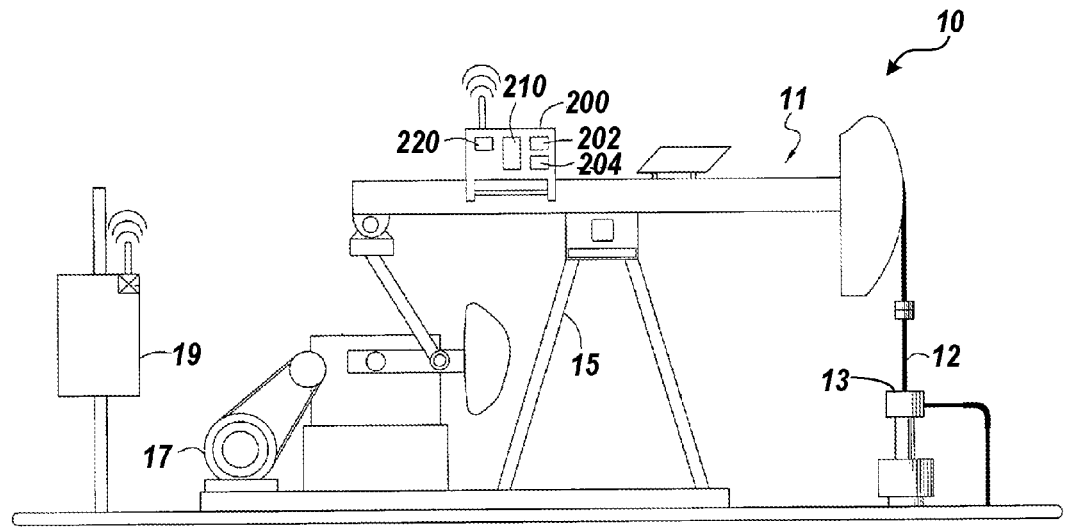
FIG. 7A illustrates a pump controller according the present disclosure for a sucker-rod pump system.

To that end, the teachings of the present disclosure can be implemented in a remote processing device or a pump controller. For example, FIG. 7A shows an embodiment of a pump controller 200 installed on a sucker-rod pump system 10, such as a pump jack commonly used to produce fluid from a well. The pump system 10 includes a walking beam 11 connected to a frame 15. The walking beam 11 operatively connects to a polished rod 12 connected via a rod string (not shown) to a downhole pump (not shown), which can be any downhole reciprocating pump as discussed herein. A motor control panel 19 controls a motor 17 to move the walking beam 11 and reciprocate the polished rod 12, which in turn operates the downhole pump. Although a pump jack is shown, other sucker-rod pump systems can be used, such as a strap jack, or any other system that reciprocates a rod string using cables, belts, chains, and hydraulic and pneumatic power systems.

In general, sensors 202 and 204 measure load and position data of the pump system 10 at the surface, and the measured data from the sensors 202 and 204 is relayed to the controller 200. After processing the information, the controller 200 sends signals to the motor control panel 19 to operate the pump system 10. A particular arrangement of controller 200 and sensors 202 and 204 is disclosed in U.S. Pat. No. 7,032,659, which is incorporated herein by reference.

As shown, the controller 200 uses a load sensor 202 to detect the weight of the fluid in the production tubing during operation of the pump system 10 and uses a position sensor 204 to measure the position of the pump system 10 over each cycle of stroke. The position sensor 204 can be any position measurement device used for measuring position relative to the top or bottom of the stroke. For example, the position sensor 204 can be a dual position sensor that produces a continuous position measurement and a discrete switch output that closes and opens at preset positions of the polished rod 12.

Alternatively, the degree of rotation of the pump system's crank arm can provide displacement data. For example, a sensor can determine when the system's crank arm passes a specific location, and a pattern of simulated polished rod displacement versus time can be adjusted to provide an estimate of polished rod positions at times between these crank arm indications. In another alternative, a degree of inclination of the walking beam 11 can provide displacement data. For example, a device can be attached to the walking beam 11 to measure the degree of inclination of the pumping unit.

Load data of the system 10 can be directly measured using a load cell inserted between a polished rod clamp and carrier bar. Alternatively, the strain on the walking beam 11 can provide the load data. Using a load sensor 202, for example, the controller 200 can measure the strain on the polished rod 12 and can then control the pump system 10 based on the strain measured. The load sensor 202 may use any of a variety of strain-measuring devices known to a person of ordinary skill in the art. For example, the load sensor 202 can be a load measurement device used on the pump system 10 that includes a load cell installed on the pumping rod 12 or mounted on the walking beam 11. The load sensor 202 can measure strain in the polished rod 12 and can use a strain-gage transducer welded to the top flange of the walking beam 11.

Alternatively, the load sensor 202 can be a strain measuring device that clamps on to a load-bearing surface of the walking beam 11 or any convenient location as disclosed in U.S. Pat. No. 5,423,224. In another example, the load sensor 202 can use an assembly similar to what is disclosed in U.S. Pat. No. 7,032,659, which is incorporated herein by reference in its entirety.

Finally, the amplitude and frequency of the electrical power signal applied to the motor 17 can be used to determine motor rotation (i.e. displacement data) and motor torque (i.e. load data). In this way, the motor speed and the displacement of the polished rod can provide a series of motor speed and displacement data pairs at a plurality of displacements along the polished rod. That displacement data which represents a complete stroke of the pump system 10 can then be converted to load on the rod string and displacement of the rod string at a plurality of displacements along the polished rod, as described in U.S. Pat. No. 4,490,094.

Figure 7B:
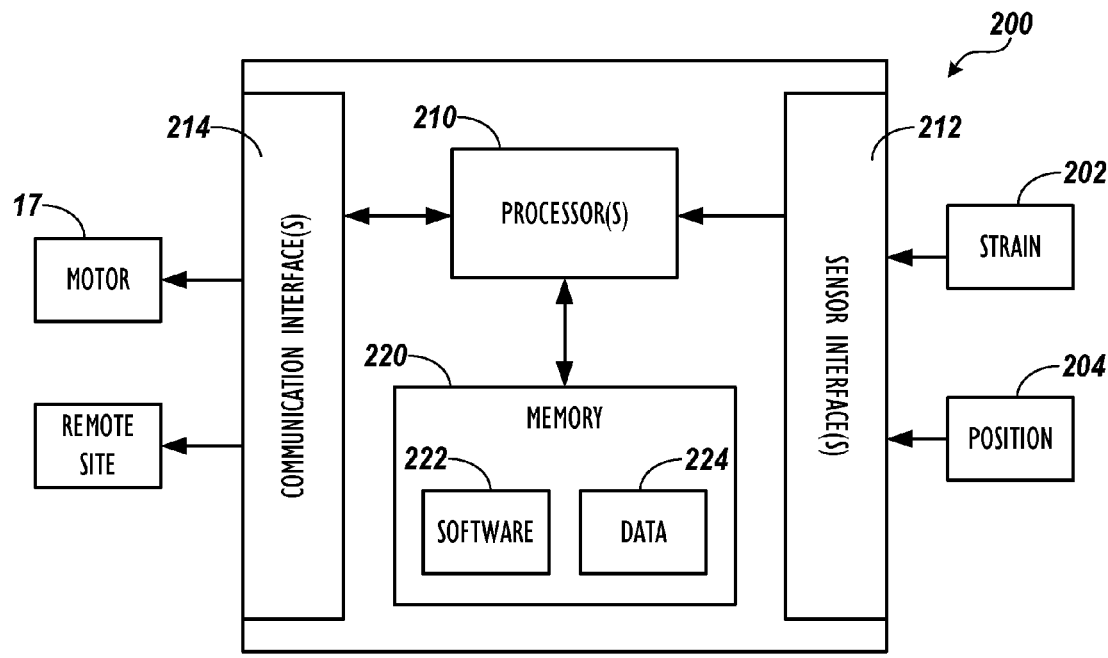
FIG. 7B illustrates a schematic of the pump controller for controlling/diagnosing the sucker-rod pump system according to the present disclosure.

Details of the pump controller 200 are schematically shown in FIG. 7B. In general, the controller 200 includes one or more sensor interfaces 212 receiving measurements from the load and position sensors 202 and 204. Additional inputs of the controller 200 can connect to other devices, such as an infrared water-cut meter, an acoustic sounding device (ASD) provide real-time data which can be logged for pressure buildup analysis and real-time calibration for fluid-level control. The controller 200 also include a power system (not shown), as conventionally provided.

The controller 200 can have software 222 and data 224 stored in memory 220. The memory 220 can be a battery-backed volatile memory or a non-volatile memory, such as a one-time programmable memory or a flash memory. Further, the memory 220 may be any combination of suitable external and internal memories.

The software 222 can include motor control software and pump diagnostic software, and the data 224 stored can be the measurements logged from the various load and position sensors 202 and 204 and calculation results. The data 224 in the memory 220 stores characteristics of the well, including the depth, azimuth, and inclination of points along the well, which can be derived from drilling and survey data. Because the rod string may be tapered as is sometimes the case, the data 224 in the memory 220 can also store characteristics of the sucker rods taper, such as depth, diameter, weight, and length of various sections of the rod.

A processing unit 210 having one or more processors then processes the measurements by storing the measurement as data 224 in the memory 220 and by running the software 222 to make various calculations as detailed herein. For example, the processing unit 210 obtains outputs from the surface sensors, such as the load and position measurements from then sensors 202 and 204. In turn, the processing unit 210 correlates the output from the load sensor 202 to the position of the polished rod 12 and determines the load experienced by the polished rod 12 during the stroke cycles. Using the software 212, the processing unit 210 then calculates the downhole card indicative of the load and position of the downhole pump.

To control the pump system 10, the pump controller 200 preferably uses an unabbreviated Everitt-Jennings algorithm with finite differences to solve the wave equation. The controller 200 calculates pump fillage and optimizes production on each stroke. This information is used to minimize fluid pounding by stopping or slowing down the pump system 10 at the assigned pump fillage setting. The pump controller 200 can also analyze the downhole pump card and determine potential problems associated with the pump and its operation. This is so because the shape, pattern, and other features associated with the downhole pump card represents various conditions of the pump and its operation.

After processing the measurements, the controller 200 sends signals to the motor control panel 19 to operate the pump system 10. For example, one or more communication interfaces 214 communicate with the motor control panel 19 to control operation of the pump system 10, such as shutting off the motor 17 to prevent pump-off, etc. The communication interfaces 214 can be capable of suitable forms of communications, and they may also communicate data and calculation results to a remote site using any appropriate communication method.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method implemented by a processing device of diagnosing a pump apparatus having a downhole pump disposed in a wellbore and having a motor at a surface of the wellbore, the downhole pump reciprocated in the wellbore by a rod string operatively moved by the motor, the method comprising:
generating downhole pump data having values indicative of downhole load and downhole position of the downhole pump by using surface measurements and a wave equation model having damping;
determining, in a first determination, a first set of actual fluid load lines for actual fluid loads of each of an upstroke and a downstroke of the downhole pump from the values of the downhole pump data, the actual fluid load lines being additional to the values of the downhole pump data;
determining, in a second determination different from the first determination, a second set of calculated fluid load lines for calculated fluid loads of each of the upstroke and the downstroke of the downhole pump from load the values of the downhole pump data, the calculated fluid load lines being additional to the values of the downhole pump data and to the actual fluid load lines;
assessing damping used to generate the downhole pump data by comparing the first set of actual fluid load lines to the second set of calculated fluid load lines; and
modifying at least one parameter of the pump apparatus based on the comparison.

2. The method of claim 1, comprising initially obtaining the surface measurements indicative of surface load and surface position of the rod string at the surface.

3. The method of claim 2, wherein obtaining the surface measurements comprises measuring the surface load and the surface position of the rod string at the surface.

4. The method of claim 2, wherein obtaining the surface measurements comprises obtaining the surface measurement from memory.

5. The method of claim 1, wherein determining, in the first determination, the actual fluid load line of the first set for the upstroke of the downhole pump from the values of the downhole pump data comprises calculating a zero of a first derivative of the downhole position in the upstroke of the downhole pump data.

6. The method of claim 1, wherein determining, in the first determination, the actual fluid load line of the first set for the downstroke of the downhole pump from the values of the downhole pump data comprises calculating a concave up point after a transfer point in the downstroke of the downhole pump data.

7. The method of claim 6, wherein calculating the concave up point comprises calculating an absolute minimum of a second derivative of the downhole position after the transfer point in the downstroke of the downhole pump data.

8. The method of claim 1, wherein determining, in the second determination different from the first determination, the second set of calculated fluid load lines for the calculated fluid loads of each of the upstroke and the downstroke of the downhole pump from the values of the downhole pump data comprises calculating the second set of calculated fluid load lines statistically for upstroke load values and downstroke load values.

9. The method of claim 1, wherein assessing the damping used to generate the downhole pump data by comparing the first set of actual fluid load lines to the second set of calculated fluid load lines comprises determining that the downhole pump data is over-damped or under-damped.

10. The method of claim 9, wherein determining that the downhole pump data is over-damped or under-damped comprises determining the downhole pump data is over-damped by determining at least that (a) the upstroke calculated fluid load line of the second set is less than the upstroke actual fluid load line of the first set, (b) the downstroke calculated fluid load line of the second set is greater than the downstroke actual fluid load line of the first set; or (c) both (a) and (b).

11. The method of claim 9, wherein determining that the downhole pump data is over-damped or under-damped comprises determining the downhole pump data is under-damped by determining at least that (a) the upstroke calculated fluid load line of the second set is greater than the upstroke actual fluid load line of the first set, (b) the downstroke calculated fluid load line of the second set is less than the downstroke actual fluid load line of the first set; or (c) both (a) and (b).

12. The method of claim 1, wherein modifying at least one parameter of the pump apparatus based on the comparison comprises:
adjusting the damping of the wave equation model based on the comparison; and
generating another downhole pump data based on the adjusted damping.

13. The method of claim 1, wherein modifying at least one parameter of the pump apparatus based on the comparison comprises stopping the motor or adjusting a speed of the motor.

14. The method of claim 1, wherein the upstroke actual fluid load line of the first set is indicative of a top of stroke of the downhole pump, and wherein the downstroke actual fluid load line of the first set is indicative of a concave up point after transfer of the fluid load of the downhole pump.

15. The method of claim 1, wherein the upstroke calculated fluid load line of the second set is indicative of distribution of load values in the upstroke of the downhole pump data, and wherein the downstroke calculated fluid load line of the second set is indicative of distribution of load values in the downstroke of the downhole pump data.

16. A controller for a pump apparatus having a downhole pump disposed in a wellbore and having a motor at a surface of the wellbore, the downhole pump reciprocated in the wellbore by a rod string operatively moved by the motor, the controller comprising:
one or more interfaces obtaining surface measurements indicative of surface load and surface position of the rod string at the surface;
memory in communication with the one or more interfaces and storing a wave equation model having damping; and
a processing unit in communication with the one or more interfaces and the memory and configured to:
generate downhole pump data having values indicative of downhole load and downhole position of the downhole pump with the surface measurements and the wave equation model,
determine, in a first determination, a first set of actual fluid load lines for actual fluid loads of each of an upstroke and a downstroke of the downhole pump from the values of the downhole pump data, the actual fluid load lines being additional to the values of the downhole pump data;

determine, in a second determination different from the first determination, a second set of calculated fluid load lines for calculated fluid loads of each of the upstroke and the downstroke of the downhole pump from the values of the downhole pump data, the calculated fluid load lines being additional to the values of the downhole pump data and to the actual fluid load lines;

compare the actual fluid load lines to the calculated fluid load lines to assess damping used to generate the downhole pump data, and modify at least one parameter of the pump apparatus based on the comparison.

17. The controller of claim 16, wherein the processing unit is configured to:

initially obtain the surface measurements indicative of surface load and surface position of the rod string at the surface; and measure the surface load and the surface position of the rod string at the surface or obtain the surface measurement from memory.

18. The controller of claim 16, wherein to determine, in the first determination, the actual fluid load line of the first set for the upstroke of the downhole pump from the values of the downhole pump data, the processing unit is configured to calculate a zero of a first derivative of the downhole position in the upstroke of the downhole pump data; or wherein to determine, in the first determination, the actual fluid load line of the first set for the downstroke of the downhole pump from the values of the downhole pump data, the processing unit is configured to calculate a concave up point after a transfer point in the downstroke of the downhole pump data, or calculate an absolute minimum of a second derivative of the downhole position after the transfer point in the downstroke of the downhole pump data.

19. The controller of claim 16, wherein to determine, in the second determination different from the first determination, the second set of calculated fluid load lines for the calculated fluid loads of each of the upstroke and the downstroke of the downhole pump from the values of the downhole pump data, the processing unit is configured to calculate the second set of the calculated fluid load lines statistically for upstroke load values and downstroke load values.

20. The controller of claim 16, wherein to compare the actual fluid load lines to the calculated fluid load lines to assess the damping used to generate the downhole pump data, the processing unit is configured to determine that the downhole pump data is over-damped or under-damped.

21. The controller of claim 20, wherein to determine that the downhole pump data is over-damped or under-damped, the processing unit is configured to:

determine the downhole pump data is over-damped by determining at least that (a) the upstroke calculated fluid load line of the second set is less than the upstroke actual fluid load line of the first set, (b) the downstroke calculated fluid load line of the second set is greater than the downstroke actual fluid load line of the first set; or (c) both (a) and (b); or determine the downhole pump data is under-damped by determining at least that (a) the upstroke calculated fluid load line of the second set is greater than the upstroke actual fluid load line of the first set, (b) the downstroke calculated fluid load line of the second set is less than the downstroke actual fluid load line of the first set; or (c) both (a) and (b).

22. The controller of claim 16, wherein to modify at least one parameter of the pump apparatus based on the comparison, the processing unit is configured to:

adjust the damping of the wave equation model based on the comparison and generate another downhole pump data based on the adjusted damping;

stop the motor; or adjust a speed of the motor.

23. A non-transitory program storage device having program instructions stored thereon for causing a programmable control device to perform a method of diagnosing a pump apparatus having a downhole pump disposed in a wellbore and having a motor at a surface of the wellbore, the downhole pump reciprocated in the wellbore by a rod string operatively moved by the motor, the method comprising:

generating the downhole pump data having values indicative of downhole load and downhole position of the downhole pump by using surface measurements and a wave equation model having damping;

determining, in a first determination, a first set of actual fluid load lines for actual fluid loads of each of an upstroke and a downstroke of the downhole pump from the values of the downhole pump data, the actual fluid load lines being additional to the values of the downhole pump data;

determining, in a second determination different from the first determination, a second set of calculated fluid load lines for calculated fluid loads of each of the upstroke and the downstroke of the downhole pump from the values of the downhole pump data, the calculated fluid load lines being additional to the values of the downhole pump data and to the actual fluid load lines;

assessing damping used to generate the downhole pump data by comparing the first set of actual fluid load lines to the second set of calculated fluid load lines; and modifying at least one parameter of the pump apparatus based on the comparison.

24. The program storage device of claim 23, comprising:

initially obtaining the surface measurements indicative of surface load and surface position of the rod string at the surface; and measuring the surface load and the surface position of the rod string at the surface or obtaining the surface measurement from memory.

25. The program storage device of claim 23, wherein determining, in the first determination, the actual fluid load line of the first set for the upstroke of the downhole pump from the values of the downhole pump data comprises calculating a zero of a first derivative of the downhole position in the upstroke of the downhole pump data; or wherein determining, in the first determination, the actual fluid load line of the first set for the downstroke of the downhole pump from the values of the downhole pump data comprises calculating a concave up point after a transfer point in the downstroke of the downhole pump data, or calculating an absolute minimum of a second derivative of the downhole position after the transfer point in the downstroke of the downhole pump data.

26. The program storage device of claim 23, wherein determining, in the second determination different from the first determination, the second set of calculated fluid load lines for the calculated fluid loads of each of the upstroke and the downstroke of the downhole pump from the load values distributed on of the downhole pump data comprises calculating the second set of calculated fluid load lines statistically for upstroke load values and downstroke load values.

27. The program storage device of claim 23, wherein assessing the damping used to generate the downhole pump data by comparing the actual fluid load lines to the calculated fluid load lines comprises determining that the downhole pump data is over-damped or under-damped.

28. The program storage device of claim 27,
wherein determining that the downhole pump data is over-damped or under-damped comprises determining the downhole pump data is over-damped by determining at least that (a) the upstroke calculated fluid load line of the second set is less than the upstroke actual fluid load line of the first set, (b) the downstroke calculated fluid load line of the second set is greater than the downstroke actual fluid load line of the first set; or (c) both (a) and (b); or
wherein determining that the downhole pump data is over-damped or under-damped comprises determining the downhole pump data is under-damped by determining at least that (a) the upstroke calculated fluid load line of the second set is greater than the upstroke actual fluid load line of the first set, (b) the downstroke calculated fluid load line of the second set is less than the downstroke actual fluid load line of the first set; or (c) both (a) and (b).

29. The program storage device of claim 23, wherein modifying at least one parameter of the pump apparatus based on the comparison comprises:
adjusting the damping of the wave equation model based on the comparison and generating another additional downhole pump data based on the adjusted damping;
stopping the motor; or
adjusting a speed of the motor.

* * * * *